US006909928B2

(12) United States Patent
Posadas-Sanchez et al.

(10) Patent No.: US 6,909,928 B2
(45) Date of Patent: Jun. 21, 2005

(54) METHOD FOR MANUFACTURING COILS

(75) Inventors: Daniel Posadas-Sanchez, Nuevo Leon (MX); Georg K. Krause-Sennewald, Nuevo Leon (MX)

(73) Assignee: Prolec G.E. S de R.L. de C.V., Nuevo Leon (MX)

( * ) Notice: Subject to any disclaimer, the term of this patent is extended or adjusted under 35 U.S.C. 154(b) by 0 days.

(21) Appl. No.: 10/186,133

(22) Filed: Jun. 28, 2002

(65) Prior Publication Data

US 2004/0002785 A1 Jan. 1, 2004

(51) Int. Cl.[7] ................................................ G06F 19/00
(52) U.S. Cl. ........................ 700/117; 700/207; 427/116
(58) Field of Search ............................ 700/90, 95, 117, 700/207; 427/16; 335/299; 29/602.1, 605, 606

(56) References Cited

U.S. PATENT DOCUMENTS

| | | | | |
|---|---|---|---|---|
| 4,576,768 A | * | 3/1986 | Markert et al. | 264/406 |
| 4,792,462 A | * | 12/1988 | Smith et al. | 427/545 |
| 5,474,799 A | * | 12/1995 | Thigpen et al. | 427/104 |
| 6,624,734 B2 | * | 9/2003 | Lanoue et al. | 336/90 |

* cited by examiner

*Primary Examiner*—Leo Picard
*Assistant Examiner*—Ryan Jarrett
(74) *Attorney, Agent, or Firm*—Abelman, Frayne & Schwab

(57) ABSTRACT

A method for manufacturing coils which achieves an uniform and complete curing of the paper impregnated with epoxy thermo curable resin placed between conductors by applying an electric current uniformly to all portions of the coil thus completely heating the coil, including the conductors near the core.

7 Claims, 1 Drawing Sheet

METHOD FOR MANUFACTURING COILS

BACKGROUND OF THE INVENTION

A. Field of the Invention

The present invention is related to methods for manufacturing coils and more particularly to a method for manufacturing coils in which a layer of paper covered with a thermo curable resin is applied between conductors and uniformly thermoset and thermo-cured with the resultant heat produced by applying a constant density electric current to all the conductor portions of the coil—Joule effect—while an axial pressure is applied to it.

B. Description of Related Art

In processes for manufacturing coils, there are usually applied methods of compacting conductors and methods for increasing the rigidity of the coil in order to increase its tolerance to short-circuit mechanical forces and thus avoiding problems related to impedance variations of the final product.

The method of compacting conductors by any means, allows the manufacturing of smaller core-coil units, and the use of lower cost smaller oil containers.

In order to help to maintain the integrity and rigidity of the coil and additionally to electrically isolate each conductor layer, the conductors are impregnated with a non-conductive resin before compacting the coil, and subsequently the resin is heat cured inside an oven.

A method for manufacturing coils is claimed in the Japanese patent No. JP2-040902 of Ogawa et al. wherein an impregnated resin is thermoset by Joule heat while being pressurized in the coil axial direction.

In Ogawa's patent, it is disclosed that the Joule effect only produces a partial heating of the coil periphery in order to thermoset the resin, and uses a contraction magnetic force produced by the electric current through the conductors for compressing the coil in an axial direction.

Since Ogawa's method only achieves the heating of the periphery of the coil, the resin impregnated in the conductors near the core of the coil is not uniformly thermoset and thermo cured.

In order to achieve an uniform heating of the entire coil and thus a complete an uniform thermo curing of all the resin impregnated in the coil, applicant developed a method for manufacturing coils which achieves an uniform and complete curing of the paper impregnated with epoxy thermo curable resin placed between conductors by applying an electric current uniformly to all portions of the coil thus completely heating the coil, including the conductors near the core.

Applicant's method comprise: connecting both bobbin terminals to a variable electric source; calculating an initial amperage to be applied to the primary and secondary bobbin windings; activating the variable electric source; detecting the temperature obtained in the both windings; if the temperature is equal to the temperature defined by the curing graphic over current time, then the amperage must be maintained in order to maintain the windings temperature equal to the value predefined in the curing graphic; if the temperature is greater than the temperature defined by the curing graphic over current time, then the amperage must be decreased until the predefined temperature is achieved; if the temperature is lesser than the temperature defined by the curing graphic over current time, then the amperage must be increased until the predefined temperature is achieved; repeat the temperature detecting step until the last time value of the curing graphic is achieved; and deactivating the variable electric source until the last time value of the curing graphic is achieved.

By the method of the present invention, it is achieved the heating of all coil layers at a relatively uniform temperature thus curing the epoxy resin impregnated in all the papers placed between all conductors.

By applying adequate amperage to the coil it is achieved a reduction of time of the thermo curing cycle in comparison with conventional convection heating methods using ovens.

The method of the present invention uses the transformer effect of the coil for heating simultaneously all portions of the coil without needing ferromagnetic cores, or coils magnetically coupled with air core having different tensions.

Thanks to an optimum heat distribution in the coil achieved by the method of the present invention it is obtained an energy saving compared with conventional heating methods.

SUMMARY OF THE INVENTION

It is therefore a main object of the invention to provide a method for manufacturing coils that achieves the heating of all the coil layers at a relatively uniform temperature thus curing the epoxy resin impregnated in all the papers placed between all conductors.

It is a further object of the invention to provide a method of the above disclosed nature that by applying an adequate amperage to the coil it achieves a reduction of time of the thermo curing cycle in comparison with conventional convection heating methods using ovens.

It is another object of the invention, to provide a method of the above disclosed nature that uses the transformer effect of the coil for heating simultaneously all portions of the coil without needing ferromagnetic cores, or coils magnetically coupled with air core having different tensions.

It is still another object of the present invention, to provide a method of the above disclosed nature that achieves an optimum heat distribution in the coil thus obtaining an energy saving compared with conventional heating methods.

These and other objects and advantages of the method of the present invention will become apparent to those of ordinary skill in the art from the following description of the embodiments of the invention which will be made with reference to the accompanying drawings.

DETAILED DESCRIPTION OF THE INVENTION

Figure 1:
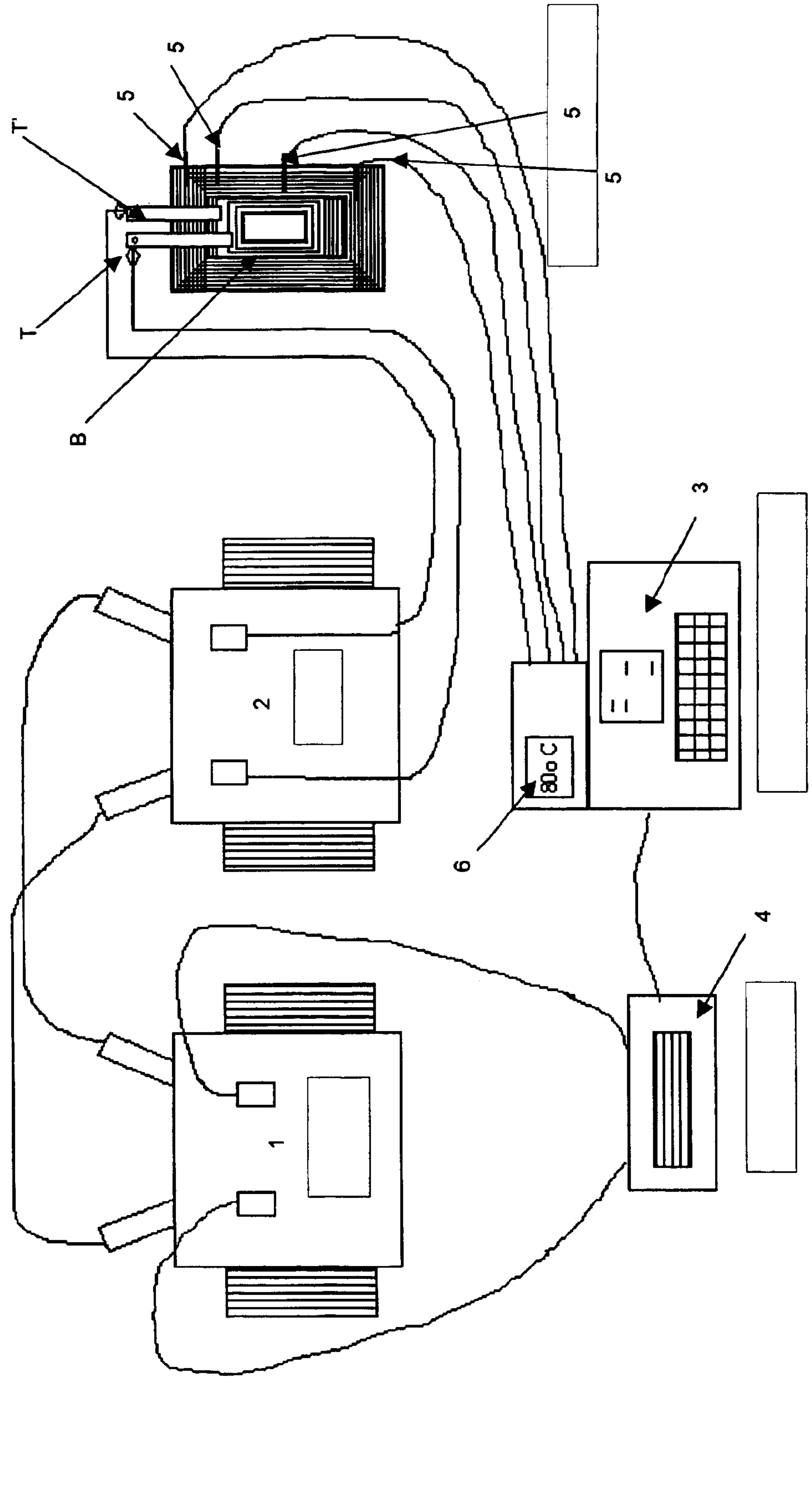
FIG. 1 is a schematic view showing the physical interconnection between the elements related to the method of the present invention.

The method of the present invention applies to compacted coils comprised by conductors and papers impregnated with a non conductive epoxy resin between conductors, which from now on will be referred to as bobbins each having two terminals located at one of the bobbin's ends.

Each bobbin type has unique characteristics, which define the voltage and amperage to be applied to the bobbin in order to maintain the temperature between predefined values for a predetermined time necessary cure the resin impregnated on the papers. Such predefined and unique temperature values over time are represented in a graphic called "curing graphic".

The method of the present invention comprises in its most broad embodiment the steps of:

connecting both bobbin "B" terminals "T, T" to a variable electric source comprising a 30 KVA motorized auto-transformer 1 having a variable output of from 0 to 480V at 35 amp, connected to a 30 KVA dry type monophase transformer having an output of 24/48V and 650 amp maximum.

calculating an initial amperage to be applied to the primary and secondary bobbin windings according to the curing graphic defined by the material and size of the conductors and to the process density and selecting the lesser calculated value so that the electric current density defined in the curing graphic is never exceed;

activating the variable electric source:

detecting the temperature obtained in the both windings by means of a thermocouple module coupled to each winding and connected to a lecture display, and comparing the temperature against the correspondent temperature value defined in the curing graphic in an specific time;

if the temperature is equal to the temperature defined by the curing graphic over the current time, then the amperage must be maintained in order to maintain the windings temperature equal to the value predefined in the curing graphic;

if the temperature is greater than the temperature defined by the curing graphic over current time, then the amperage must be decreased until the predefined temperature is achieved;

if the temperature is lesser than the temperature defined by the curing graphic over current time, then the amperage must be increased until the predefined temperature is achieved;

repeat the temperature detecting step until the last time value of the curing graphic is achieved; and deactivating the variable electric source until the last time value of the curing graphic is achieved;

In a most specific embodiment of the method of the present invention, said variable electric source comprises a variable motorized auto transformer connected to the input of a step down transformer having a capacity of 30 kVA, 24/48 volts and 1250 Amps for controlling the voltage and amperage to predetermined values, said step down transformer comprising a primary winding and two independent windings which comprise the secondary winding.

The variable electric source is controlled by electronic means comprising a CPU, volatile and non volatile memory means and data input and output means, connected to control means for the variable electric source.

The control means 4 for the variable electric source comprise electromechanic relays and contactors, digitally activated by miniature relays activated from data acquisition means having discrete input and outputs, and the system is complemented with modules having analogical input and outputs and thermocouple modules controlled by the CPU.

The control means perform two basic functions:

automatically perform a parallel connection of the secondary windings of the step down transformer 2 for providing a maximum amperage of 1250 Amps at 24V and 30 KVA to the bobbin to be processed "B";

automatically perform a series connection of the secondary windings of the step down transformer 2 for providing a maximum amperage of 625 Amps at 48V and 30 KVA to the bobbin to be processed "B";

said functions carried out by connecting the terminals of the beginning and end of the step down transformer 2 secondary windings to three magnetic contactors, each independently activated by the CPU.

There are included four temperature sensors 5 for the winding to be processed "B", and an analog input module connected by an interface to the system's CPU instantly processes each sensor signal.

The CPU is continually running an algorithm resident in memory, comprising the following instruction sequence:

detecting and storing in volatile memory means the current bobbin "B" temperature as initial temperature;

calculating the required voltage for raising the bobbin "B" temperature by accessing a database containing the nominal parameters of tension, dimension and conductor kind and impedance percentage of the bobbin to be processed, wherein the required voltage is obtained by computing the following formula:

$$Vreq=\%\ Z * Vnom/100$$

Wherein

Vreg=required voltage for raising the temperature of the bobbin.

% Z=impedance percentage.

Vnom=nominal voltage of one of the bobbin windings.

If the resulting voltage is lesser than 20 Vac, it is automatically performed a parallel connection of the secondary windings of the step down transformer 2;

If the resulting voltage is greater than 20 Vac, it is automatically performed a series connection of the secondary windings of the step down transformer 2;

detecting and storing in volatile memory means the amperage obtained by the series or parallel connection of the step down transformer 2 secondary windings by an ampere meter;

If the amperage overpasses the maximum amperage permissible by the equipment, the variable electric source is disconnected and an alarm is activated;

If an open circuit condition is detected, the variable electric soured is disconnected and an alarm is activated;

detecting and storing in volatile memory means the bobbin "B" temperature and the amount of time passed since the beginning of the process and comparing both values with the temperature over time values predetermined in the curing graphic;

if the detected temperature is greater than the temperature predefined in the curing graphic, an amperage decreasing routine is activated, which comprises a plurality of amperage adjustments based on deviation percentages of the temperature with respect to the objective value so that the amperage is adjusted to a lesser value than the initial amperage value;

if the detected temperature is lesser than the temperature predefined in the curing graphic, then an amperage increasing routine is activated, which comprises detecting the current temperature and increasing the amperage by a percentage depending on the temperature percentage below the objective value;

if the detected temperature is equal to the temperature predefined in the curing graphic, then the initial amperage is automatically adjusted to a lesser value, that decreases the voltage applied to the bobbin "B" which is maintained by an indefinite period of time in accordance with the curing graphic;

repeat the detecting temperature step until the detected temperature is equal to the temperature predefined in the curing graphic, and the last time value in the curing graphic is achieved; and disconnecting the variable electric source.

The method of the present invention may be applied to low-high and low-high-low interlaced bobbin configurations and with high tension accessories such as a double voltage changer and derivation changer. Also, the method may be applied to monophase and three-phase distribution transformers of any capacity and nominal voltages, manufactured under international norms.

The variable electric source amperage may be applied to heat one bobbin or simultaneously two bobbins, having the same design, wherein the amperage to be applied to each bobbin does not exceed half the capacity of the variable electric source. The electric current flowing trough the coil being processed, induce a force in the other magnetically coupled coil with air core, which promotes the flow of electric current trough it. When applying the method for processing two bobbins, the total amperage is equally distributed in both bobbins and by monitoring and controlling the temperature in one bobbin, it is possible to precisely know the status of the second bobbin with only one equipment applied to one of the two bobbins, which represent a time reduction of as far as 50% for bobbins having an amperage of as far as 50% the capacity of the variable electric source.

Finally it must be understood that the method for manufacturing coils of the present invention, is not limited exclusively to the above described and illustrated embodiments and that the persons having ordinary skill in the art can, with the teaching provided by this invention, make modifications to the method of the present invention, which will clearly be within the true inventive concept and scope of the invention which is claimed in the following claims.

What is claimed is:

1. A method for manufacturing bobbins having two terminals and comprised by a primary and a secondary winding each comprising an arrangement of conductors and papers impregnated with a non conductive resin between conductors, having a curing graphic for the resin, including a plurality of values of temperature over time, said method comprising:

connecting both bobbin terminals to a variable electric source;

calculating an initial amperage to be applied to the primary and secondary bobbin windings;

activating the variable electric source;

detecting the temperature obtained in both windings;

if the temperature is equal to the temperature defined by the curing graphic over current time, then the amperage must be maintained in order to maintain the windings temperature equal to the value predefined in the curing graphic;

if the temperature is greater than the temperature defined by the curing graphic over current time, then the amperage must be decreased until the predefined temperature is achieved;

if the temperature is lower than the temperature defined by the curing graphic over current time, then the amperage must be increased until the predefined temperature is achieved;

repeat the temperature detecting step until the last time value of the curing graphic is achieved; and deactivating the variable electric source when the last time value of the curing graphic is achieved, wherein the variable electric source comprises a variable motorized auto transformer connected to the input of a step down transformer having a capacity of 30 kVA, 24/48 volts and 1250 Amps for controlling the voltage and amperage to predetermined values, said step down transformer comprising a primary winding and two independent windings which comprise the secondary winding and wherein said variable electric source is controlled by electronic means comprising a CPU, volatile and non volatile memory means and data input and output means, connected to control means for the variable electric source.

2. A method as claimed in claim 1 wherein the temperature is detected by temperature sensors connected to display means.

3. A method for manufacturing bobbins having two terminals and comprised by a primary and a secondary winding each comprising an arrangement of conductors and papers impregnated with a non conductive resin between conductors, having a curing graphic for the resin, including a plurality of values of temperature over time, said method comprising:

connecting both bobbin terminals to a variable electric source;

calculating an initial amperage to be applied to the primary and secondary bobbin windings;

activating the variable electric source;

detecting the temperature obtained in both windings;

if the temperature is equal to the temperature defined by the curing graphic over current time, then the amperage must be maintained in order to maintain the windings temperature equal to the value predefined in the curing graphic;

if the temperature is greater than the temperature defined by the curing graphic over current time, then the amperage must be decreased until the predefined temperature is achieved;

if the temperature is lower than the temperature defined by the curing graphic over current time, then the amperage must be increased until the predefined temperature is achieved;

repeating the temperature detecting step until the last time value of the curing graphic is achieved; and deactivating the variable electric source when the last time value of the curing graphic is achieved, wherein the variable electric source comprises a variable motorized auto transformer connected to the input of a step down transformer having a capacity of 30 kV A, 24/48 volts and 1250 Amps for controlling the voltage and amperage to predetermined values, said step down transformer comprising a primary winding and two independent windings which comprise the secondary winding and wherein said variable electric source is controlled by electronic means comprising a CPU, volatile and non volatile memory means and data input and output means, connected to control means for the variable electric source, said control means comprising electromechanic relays and contactors, digitally activated by miniature relays activated from data acquisition means having discrete input and outputs, and wherein the electronic means are complemented with modules having analogical input and outputs and thermocouple modules controlled by the CPU.

4. A method for manufacturing bobbins having two terminals and comprised by a primary and a secondary winding each comprising an arrangement of conductors and papers impregnated with a non conductive resin between conductors, having a curing graphic for the resin, including a plurality of values of temperature overtime, said method comprising:

connecting both bobbin terminals to a variable electric source;

calculating an initial amperage to be applied to the primary and secondary bobbin windings;

activating the variable electric source;

detecting the temperature obtained in both windings;

if the temperature is equal to the temperature defined by the curing graphic over current time, then the amperage must be maintained in order to maintain the windings temperature equal to the value predefined in the curing graphic;

if the temperature is greater than the temperature defined by the curing graphic over current time, then the amperage must be decreased until the predefined temperature is achieved;

if the temperature is lower than the temperature defined by the curing graphic over current time, then the amperage must be increased until the predefined temperature is achieved;

repeating the temperature detecting step until the last time value of the curing graphic is achieved; and deactivating the variable electric source when last time value of the curing graphic is achieved; and wherein the variable electric source comprises a variable motorized auto transformer connected to the input of a step down transformer having a capacity of 30 kVA, 24/48 volts and 1250 Amps for controlling the voltage and amperage to predetermined values, said step down transformer comprising a primary winding and two independent windings which comprise the secondary winding and wherein said variable electric source is controlled by electronic means comprising a CPU, volatile and non volatile memory means and data input and output means, connected to control means for the variable electric source, said control means comprising electromechanic relays and contactors, digitally activated by miniature relays activated from data acquisition means having discrete input and outputs, and automatically performing two basic functions:

performing a parallel connection of the secondary windings of the step down transformer for providing a maximum amperage of maximum amperage of 1250 Amps at 24V and 30 KVA to the bobbin to be processed;

performing a series connection of the secondary windings of the step down transformer for providing a maximum amperage of 625 Amps at 48V and 30 KVA to the bobbin to be processed;

wherein said functions are carried out by connecting the terminals of the beginning and end of the step down transformer secondary windings to three magnetic contactors, each independently activated by the CPU.

5. A method for manufacturing bobbins having two terminals and comprised by a primary and a secondary winding each comprising an arrangement of conductors and papers impregnated with a non conductive resin between conductors, having a curing graphic for the resin, including a plurality of values of temperature over time, said method comprising:

connecting both bobbin terminals to a variable electric source;

calculating an initial amperage to be applied to the primary and secondary bobbin windings;

activating the variable electric source;

detecting the temperature obtained in both windings;

if the temperature is equal to the temperature defined by the curing graphic over current time, then the amperage must be maintained in order to maintain the windings temperature equal to the value predefined in the curing graphic;

if the temperature is greater than the temperature defined by the curing graphic over current time, then the amperage must be decreased until the predefined temperature is achieved;

if the temperature is lower than the temperature defined by the curing graphic over current time, then the amperage must be increased until the predefined temperature is achieved;

repeating the temperature detecting step until the last time value of the curing graphic is achieved; and deactivating the variable electric source when the last time value of the curing graphic is achieved, wherein the variable electric source comprises a variable motorized auto transformer connected to the input of a step down transformer for controlling the voltage and amperage to predetermined values, said step down transformer comprising a primary winding and two independent windings which comprise the secondary winding and wherein said variable electric source is controlled by electronic means comprising a CPU, volatile and non volatile memory means and data input and output means, connected to control means for the variable electric source, said control means comprising electromechanic relays and contactors, digitally activated by miniature relays activated from data acquisition means having discrete input and outputs, and wherein the electronic means are complemented with modules having analogical input and outputs, and thermocouple modules controlled by the CPU, wherein the CPU is continually running an algorithm resident in memory, comprising the following instruction sequence: detecting and storing in volatile memory means the current bobbin temperature as initial temperature; calculating the required voltage for raising the bobbin temperature by accessing a database containing the nominal parameters of tension, dimension and conductor kind and impedance percentage of the bobbin to be processed, wherein the required voltage is obtained by computing the following formula: Vreq=% Z* Vnom/100 wherein Vreg=required voltage for raising the temperature of the bobbin. % Z=impedance percentage. Vnom=nominal voltage of one of the bobbin windings; If the resulting voltage is lesser than 20 Vac, it is automatically performed a parallel connection of the secondary windings of the step down transformer; if the resulting voltage is greater than 20 Vac, it is automatically performed a series connection of the secondary windings of the step down transformer; detecting and storing in volatile memory means the amperage obtained by the series or parallel connection of the step down secondary windings by an amperemeter; if the amperage overpass the maximum amperage permissible by the equipment, the variable electric source is disconnected and an alarm is activated; if an open circuit condition is detected, the variable electric soured is disconnected and an alarm is activated; detecting and storing in volatile memory means the bobbin temperature and the amount of time passed since the beginning of the process and comparing both values with the temperature over time values predetermined in, the curing graphic; if the detected temperature is greater than the temperature predefined in the curing graphic, an amperage decreasing routine is activated, which comprises a plurality of amperage adjustments based on deviation percentages of the temperature with respect to the objective value so that the amperage is adjusted to a lesser value than the initial amperage value; if the detected temperature is lesser than the temperature predefined in the curing graphic, then an amperage increasing routine is activated, which comprises detecting the current temperature and increasing the amperage by a percentage depending on the temperature percentage below an objective value; if the detected temperature is equal to the temperature predefined in the curing graphic, then the initial amperage is automatically adjusted to a lesser value, that decreases the voltage applied to the bobbin which is maintained by an indefinite period of time in accordance with the curing graphic; repeat the detecting temperature step until the detected temperature is equal to the temperature predefined in the curing graphic; and the last time value in the curing graphic is achieved; and disconnecting the variable electric source.

6. A method for manufacturing bobbins having two terminals and comprised by a primary and a secondary winding each comprising an arrangement of conductors and papers impregnated with a non conductive resin between conductors, having a curing graphic for the resin, including a plurality of values of temperature over time, said method comprising:

connecting both bobbin terminals to a variable electric source;

calculating an initial amperage to be applied to the primary and secondary bobbin windings;

activating the variable electric source;

detecting the temperature obtained in both windings;

if the temperature is equal to the temperature defined by the curing graphic over current time, then the amperage must be maintained in order to maintain the windings temperature equal to the value predefined in the curing graphic;

if the temperature is greater than the temperature defined by the curing graphic over current time, then the amperage must be decreased until the predefined temperature is achieved;

if the temperature is lower than the temperature defined by the curing graphic over current time, then the amperage must be increased until the predefined temperature is achieved;

repeating the temperature detecting step until the last time value of the curing graphic is achieved; and deactivating the variable electric source when the last time value of the curing graphic is achieved, wherein the method may be applied to low-high and low-high-low interlaced bobbin configurations and with high tension accessories.

7. The method as claimed in claim 6, wherein the high tension accessories are a double voltage changer and derivation changer.

* * * * *